United States Patent [19]

Minagawa et al.

[11] 4,244,848

[45] Jan. 13, 1981

[54] HALOGEN CONTAINING RESIN COMPOSITION

[75] Inventors: Motonobu Minagawa, Koshigaya; Tetsuo Sekiguchi, Hasuda; Kenji Nakazawa, Urawa, all of Japan

[73] Assignee: Argus Chemical Corporation, Brooklyn, N.Y.

[21] Appl. No.: 8,051

[22] Filed: Jan. 31, 1979

[30] Foreign Application Priority Data

Jan. 31, 1978 [JP] Japan .................................. 53/9609

[51] Int. Cl.$^3$ ........................ C08K 5/11; C08K 5/09; C08K 5/07

[52] U.S. Cl. ........................ 260/23 XA; 252/406; 260/45.7 P; 260/45.7 R; 260/45.75 W; 260/45.85 R

[58] Field of Search ............... 252/406; 260/45.7 P, 260/45.7 R, 45.75 W, 45.85 R, 23 XA

[56] References Cited

U.S. PATENT DOCUMENTS

| | | | |
|---|---|---|---|
| 2,307,075 | 1/1943 | Quattlebaum et al. | 260/48.85 E |
| 2,499,503 | 3/1950 | Huff et al. | 260/45.7 P |
| 2,669,548 | 2/1954 | Darby et al. | 260/45.75 W |
| 2,831,824 | 4/1958 | White | 260/45.7 P |
| 2,935,490 | 5/1960 | Havens et al. | 260/45.7 P |
| 3,274,014 | 9/1966 | Harrington et al. | 260/45.75 W |
| 3,492,267 | 1/1970 | Wood | 260/45.75 W |
| 3,493,536 | 2/1970 | Weisfeld | 260/45.7 P |
| 4,102,839 | 7/1978 | Crochemore et al. | 260/45.7 R |
| 4,123,399 | 10/1978 | Gay | 260/45.7 R |
| 4,123,400 | 10/1978 | Gay | 260/45.7 R |

*Primary Examiner*—V. P. Hoke
*Attorney, Agent, or Firm*—Otto S. Kauder

[57] ABSTRACT

An environmentally acceptable stabilizer composition is provided for enhancing the resistance to deterioration upon heating at 175° C. of a vinyl chloride polymer from which lead, cadmium, mercury, thallium, and arsenic are substantially excluded, comprising (A) at least one zinc, alkali metal, or alkaline earth metal organic phosphate ester salt having per metal atom from one to a number equal to the valence of the metal of phosphate ester groups and from one to two organic groups per phosphate groups, the organic groups being alkyl, aryl, alkaryl, aralkyl, ether-interrupted allyl, or ether-interrupted aralkyl groups having from 1 to about 80 carbon atoms; and (B) at least one betadiketone compound having 5 to about 30 carbon atoms which is a cyclic or open-chain betadiketone or a zinc, alkali metal or alkaline earth metal salt thereof.

A stabilized vinyl chloride polymer composition in which the environmentally acceptable composition is used as stabilizer is also provided.

14 Claims, No Drawings

HALOGEN CONTAINING RESIN COMPOSITION

BACKGROUND OF THE INVENTION

This invention relates to environmentally acceptable stabilized vinyl chloride polymer compositions from which arsenic, cadmium, lead, mercury, and thallium are substantially excluded, and to a stabilizer composition for such environmentally acceptable stabilized vinyl chloride polymer compositions to minimize undesirable yellowing and discoloration during the process of fabricating and shaping such compositions into useful articles at elevated temperatures and during the subsequent use of such articles exposed to light.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil epoxide, isooctyl epoxy-stearate, and diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Poly-Vinyl Chloride," *Rubber Age* 85 449–452 (June, 1959), and by H. Verity-Smith, *British Plastics* 27 176–179, 213–217, 307–311 (1954); the brochure by the same author *The Development of the Organotin Stabilizer* (Tin Research Institute, 1959). For a recent summary of the principal types of stabilizers routinely used in vinyl chloride polymers, the disclosure of Kaneko U.S. Pat. No. 4,111,889 of Sept. 5, 1978 can be consulted.

Preponderant in quantity used for many years have been the lead salts, such as tribasic lead sulfate, normal and dibasic lead stearate, dibasic lead phthalate, dibasic leadphosphite, and basic lead carbonates and silicates. Vinyl chloride polymer compositions stabilized with lead compounds are recognized as outstanding in electrical properties and good in color protection during long extended processing at high temperatures, while poor in clarity owing to the insolubility and pigmenting properties of the lead compounds. Next in quantity used have been the organic salt mixtures containing cadmium, as disclosed for example by W. Leistner, in U.S. Pat. No. 2,716,092 of Aug. 23, 1955, G. Mack in U.S. Pat. No. 2,935,491, of May 23, 1960 and J. Scullin in U.S. Pat. No. 3,390,112 of June 25, 1968. Cadmium containing stabilizers have provided excellent heat stability combined with outstanding clarity and resistance to weathering exposure. With the steady increase in usage of vinyl chloride polymer compositions and coincidentally increased concern about the accumulation of toxic materials in the human environment, there has developed a need to replace the lead and cadmium based stabilizers by environmentally more acceptable and no less effective stabilizers. The very favorable properties of the lead and cadmium containing stabilizers, however, have made it difficult to find equivalent replacements. In particular, vinyl chloride polymer compositions stabilized with materials other than lead and cadmium have been subject to objectionable yellowing even where the time to severe heat failure was relatively satisfactory.

J. Darby in U.S. Pat. No. 2,669,548 of Feb. 16, 1954 disclosed halogen-containing resin compositions having improved stability containing a mixture of a zinc salt and a calcium chelate derivative of a 1,3-dicarbonyl compound capable of keto-enol tautomerism. Zinc salts can be zinc salts of organic acids and zinc salts of weak inorganic acids, for example zinc acetate, zinc propionate, zinc octanoate, zinc ricinoleate stearate, and zinc salts of carbonic, silicic, and boric acids. Calcium chelates can be derivatives of betadiketones, betaketoacids, and the esters of betaketoacids, for example the calcium chelates of ethyl acetoacetate, phenyl acetoacetate, acetoacetic acid, acetylacetone, benzoylacetone, and diacetylacetone.

F. Ebel in U.S. Pat. No. 3,001,970 of September 26, 1961 disclosed preventing the discoloration of polymers of vinylidene chloride in light by adding a small amount of a dibenzoylmethane of the general formula:

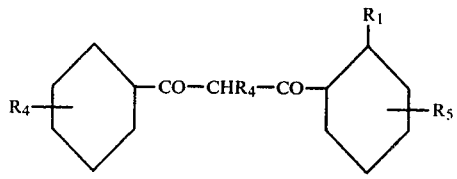

in which $R_1$ represents hydrogen or a hydroxyl radical, and $R_2$, $R_3$ and $R_4$ represent hydrogen or hydrophobic radicals. Such hydrophobic radicals are for example alkyl, cycloalkyl, aryl, aralkyl and halogen radicals.

British Pat. No. 1,141,971 of May 23, 1967 to W. R. Grace & Co. disclosed zinc complexes of beta-dicarbonyl compounds used as stabilizing additives for chlorine-containing polymers in general, and polyvinyl chloride in particular. The zinc complexes possess the general formula:

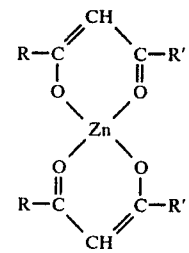

wherein R and R' are the same or different and are each hydrogen or an alkyl, alkoxy, phenyl or phenoxy group. Preferably when R represents an alkyl or alkoxy group, it contains 1 to 20 carbon atoms.

L. Wiesfeld in U.S. Pat. No. 3,493,536 of Feb. 3, 1970 disclosed that diaroylmethane compounds of the general formula $C_6H_5CO-CHR-COC_6H_5$ wherein R is hydrogen or a monovalent hydrocarbon radical provide stabilizing action against the sensitizing effect of bismuth or antimony compounds on chlorine-containing materials.

M. Crochemore in U.S. Pat. No. 4,102,839 of July 25, 1978 disclosed the possibility of preventing the thermal breakdown of vinyl chloride polymers by adding 0.1 to 5% by weight of the polymer of one or more carboxylic acid salts of 2-valent metals such as calcium, barium, zinc, lead, or cadmium and 0.05 to 5% by weight of an organic compound having the formula: $R_1$—CO—CH$R_2$—CO—$R_3$ in which $R_1$ and $R_3$, which can be alike or different, represent linear or branched alkyl or alkenyl groups with up to 30 carbon atoms, arylkyl groups with 7 to 36 carbon atoms, or aryl or cycloaliphatic groups with less than 14 carbon atoms, optionally substituted with halogen atoms, aryl or cycloaliphatic groups, methyl or ethyl groups; aliphatic $R_1$ and $R_3$ groups can also be modified by the presence of one or more

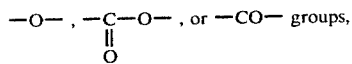

or taken together represent a 2-valent alkylene group having two to five carbon atoms; also, one of the groups $R_1$ and $R_3$ can be a hydrogen atom; $R_2$ is a hydrogen atom, an alkyl or alkenyl group with up to 30 carbon atoms which can include

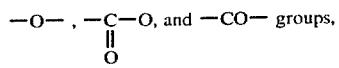

a group R—CO—$R_4$ where $R_4$ is an alkyl group with 1 to 30 carbon atoms or an aryl group when $R_1$ and $R_3$ are non-aromatic, or a group having the formula —$R_5$—CH(—CO—$R_1$)—CO—$R_3$ in which $R_5$ is an alkylene group with 1 to 6 carbon atoms. The combination of carboxylic acid metal salt and 1,3-dicarbonyl compound is stated to be superior to an equimolar quantity of 1,3-dicarbonyl compound metal chelate.

M. Gay in U.S. Pat. Nos. 4,123,399 and 4,123,400 of Oct. 31, 1978 has disclosed vinyl chloride compositions containing relative to the weight of the polymer from 0.1 to 5% of one of the four pairs of organic salts of the metals Ca-Zn, Ca-Cd, Ba-Zn, or Ba-Cd, the organic salts being salts of saturated or unsaturated, substituted or unsubstituted aliphatic carboxylic acids, or aromatic carboxylic acids, together with 0.05 to 1% by weight of a polyol, and 0.05 to 5 parts of an organic compound having the formula $R_1$—CO—CH$R_2$—CO—$R_3$ in which $R_1$, $R_2$, and $R_3$ are defined as by Crochemore, above. Metal organic phosphate ester salts are well known. The range of available products in terms of ratios of esterifying group to phosphate and to metal is indicated, for example, in an article by H. Adler and W. H. Woodstock in "Chemical Industries" for October 1942, pages 516ff. The use of certain salts described by Adler in vinyl chloride polymer compositions is disclosed, for example, by C. E. Huff in U.S. Pat. No. 2,499,503 of Mar. 7, 1950 and by W. H. White in U.S. Pat. No. 2,831,824 of Apr. 22, 1958. W. Leistner in U.S. Pat. No. 2,997,454 of Aug. 22, 1961 disclosed polyvinyl chloride compositions of excellent initial color stabilized with a combination of an organic triphosphite with a heavy metal fatty acid salt to which there is added a phosphorus compound having at least one hydrogen atom of acidic character. The phosphorus acids in Leistner's compositions are defined by the formula

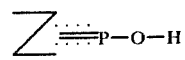

In this formula, phosphorus has a valence of three or five, the additional two valences being indicated by dotted line bonds. Typical phosphorus acids coming within this general formula are the following:

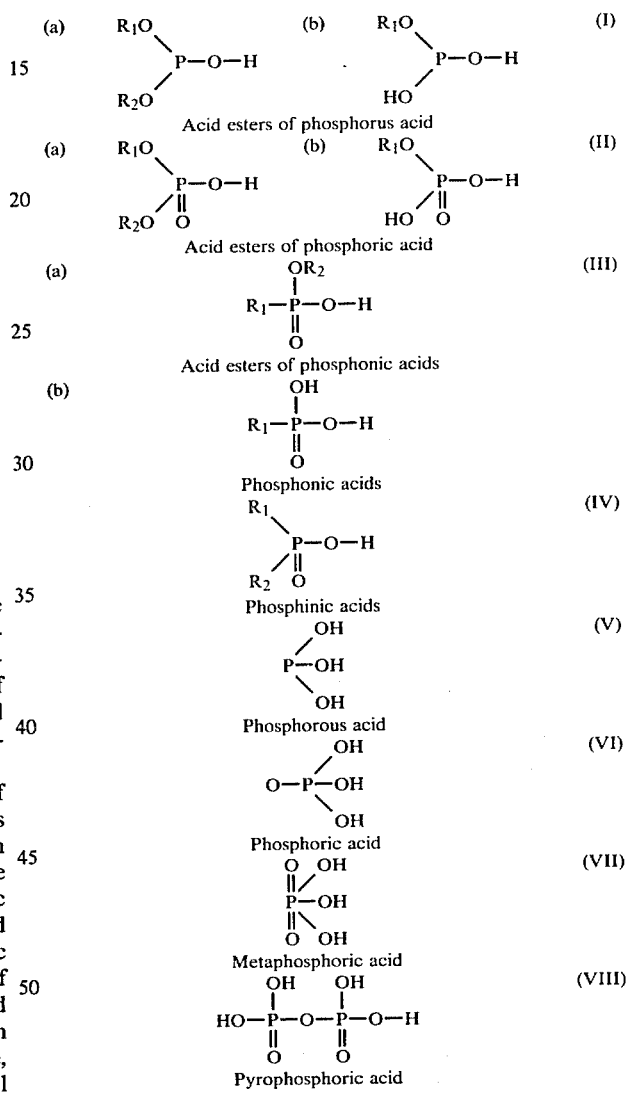

In the above formulas $R_1$ and $R_2$ represent an organic aliphatic, aromatic or nonaromatic alicyclic hydrocarbon or heterocyclic radical having from one to about thirty carbon atoms. $R_1$ and $R_2$ in I, II, III(a) and IV may be the same or different. R. Harrington, Jr. in U.S. Pat. No. 3,274,014 of Sept. 20, 1966 disclosed yarn compositions of synthetic fibers having incorporated a small amount of a metal monoalkyl or monoaryl phosphate, metal dialkyl phosphate, metal alkyl phosphonate, metal alkyl (alkyl phosphonate) or metal dialkyl phosphite are resistant to ultraviolet light. Examples show among others yarns spun from dopes of modified vinylidene chloride-acrylonitrile copolymer containing either zinc (ethyl phosphonate) or zinc bis(ethyl(ethyl phosphonate)).

P. Klemchuk in U.S. Pat. No. 3,219,605 of Nov. 23, 1965 disclosed cadmium, barium, calcium, or zinc salts of monoalkyl phosphites are remarkably effective light stabilizers for polyvinyl chloride compositions, alone or in combination with other light and/or thermal stabilizers. The metal salts are defined by the formula

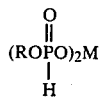

wherein
R is an alkyl radical, e.g. alkyl having from 1 to 30 carbon atoms, preferably having from 1 to 12 carbon atoms, and
M is a divalent metal which may be cadmium, barium, calcium or zinc.

Farbwerke Hoechst in French Pat. No. 1,412,321 of Aug. 16, 1965 disclosed the stabilization against light of polyvinyl chloride with 0.1 to 5% by weight of nickel organic phosphites containing only nickel, phosphorus, carbon, hydrogen and oxygen, along with barium-cadmium soaps, organic phosphite, epoxy compounds, and optionally ultraviolet absorbers. T. Kamijo in U.S. Pat. No. 3,312,658 of Apr. 4, 1967 disclosed a stabilizer combination of alkyl-substituted phenolic antioxidant with a synergistic agent which is a nickel salt of a monoester of diester of phosphoric acid, represented by one or both of the formulas:

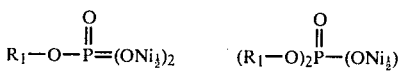

where the R radicals are selected from the group consisting of alkyl, aryl, alkaryl and cycloalkyl radicals.

SUMMARY OF THE INVENTION

In accordance with this invention, environmentally acceptable stabilized vinyl chloride polymer compositions are prepared from which environmentally objectionable metals such as arsenic, cadmium, lead, mercury, and thallium are excluded. The exclusion of the objectionable metals is accomplished by avoiding the use of previously irreplaceable cadmium and lead based stabilizers and holding the level of unavoidable incidental contamination by objectionable metals to the lowest practicable amount, usually governed by the natural impurity levels found in metal compound starting materials used in the preparation of vinyl chloride polymer stabilizers based on environmentally acceptable metals such as zinc, tin, calcium, barium, lithium, sodium, potassium, strontium, and magnesium. Thus the use of a typical lead based stabilizer formulation in polyvinyl chloride plastic results in a lead content of 25,000 to 50,000 mg lead per kilogram of plastic while the use of typical cadmium containing stabilizer formulation contributes 200 to 2000 mg cadmium per kilogram of plastic. The use, on the other hand, of stabilizers made from available commercial grades of environmentally acceptable metals without addition of compounds of the listed objectionable metals contributes per kilogram of plastic 10 mg or less of arsenic, cadmium, lead, mercury, and thallium combined. Accordingly, environmentally acceptable stabilized vinyl chloride polymer compositions are defined as stabilized vinyl chloride polymers compositions containing not more than 10 mg of arsenic, cadmium, lead, mercury, and thallium combined per kilogram of composition.

Also in accordance with this invention, an environmentally acceptable stabilizer composition for enhancing the resistance to deterioration upon heating at 175° C. of a vinyl chloride polymer from which lead, cadmium, mercury, thallium, and arsenic are substantially excluded, comprises (A) at least one dialkyltin, zinc, alkali metal, or alkaline earth metal organic phosphate ester salt having per metal atom from one to a number equal to the valence of the metal of phosphate ester groups and from one to two organic groups per phosphate groups, the organic groups being alkyl, aryl, alkaryl, aralkyl, cycloalkyl, ether-interrupted alkyl, or ether-interrupted aralkyl groups having from 1 to about 80 carbon atoms; and (B) at least one betadiketone compound having 5 to about 30 carbon atoms which is a cyclic or open-chain beta-diketone or a zinc, alkali metal or alkaline earth metal salt thereof.

The proportions of the organic phosphate ester salt and beta-diketone compound are chosen in such a way that in a vinyl chloride polymer stabilized according to this invention there are present per 100 parts by weight of the polymer from 0.01 to 5 parts, preferably from 0.1 to 3 parts by weight of organic phosphate ester salt and from 0.001 to 1 part by weight of beta-diketone compound. In a preferred range of stabilizer compositions according to this invention, there are present from 1 to 50 parts by weight of organic phosphate ester salt per part by weight of beta-diketone compound.

DESCRIPTION OF PREFERRED EMBODIMENTS

The metal organic phosphate ester salt can be represented by the formula:

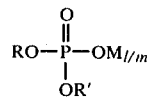

In which R is an organic group which can be an alkyl, aryl, alkaryl, aralkyl, ether-interrupted alkyl, or ether-interrupted aralkyl group having from 1 to 80 carbon atoms as appropriate to each type; M is a metal having a valence of m; R' is a group R or a metal equivalent unit $M_{1/m}$ and m is an integer from 1 to 2. M can be a metal of Group I of the Periodic Table having a atomic weight less than 50, such as potassium, sodium, lithium; an environmentally acceptable metal of Group II, such as barium, strontium, zinc, calcium, and magnesium and tin substituted with two alkyl groups having from 1 to 12 carbon atoms such as dimethyltin, di-n-butyltin, di-isobutyltin, di-octyltin, and dilauryltin.

In the metal organic phosphate ester salt according to this invention, aryl and alkaryl aromatic R groups include phenyl and preferably groups having 7 to about 30 carbon atoms such as 1-naphthyl, 2-naphthyl, tolyl, xylyl, ethylphenyl, butylphenyl, t-butylphenyl, octylphenyl, isooctylphenyl, nonylphenyl, 2,4-di-t-butylphenyl, p-dodecylphenyl, didodecylphenyl, cyclohexylphenyl, dicyclohexylphenyl, benzyl, 1-phenylethyl, 2-phenylethyl, 3-phenylpropyl, 7-phenylheptyl, p-ethoxybenzyl, 2,4-dichlorobenzyl, p-pentadecylbenzyl, and trimethylbenzyl.

Ether-interrupted aralkyl groups have 8 or more carbon atoms and 1 or more ether oxygen atoms disposed in such a way that ether oxygen atoms are separated from one another by two or more carbon atoms; accordingly the number of carbon atoms is at least six more than twice the number of ether oxygen atoms. Ether-interrupted aralkyl groups include for example 2-phenoxyethyl, 2(2'-phenoxyethoxy) ethyl, 3-phenoxypropyl, 4-p-t-butylphenoxybutyl, 1-phenoxy-2-propyl, p-t-octylphenoxyethyl, p-t-octylphenoxy(polyethoxyethyl) derived from ethoxylated p-t-octylphenol with 4 to 33 ethylene oxide units, nonylphenoxy(polyethoxyethyl) derived from ethoxylated nonylphenol with 2 to 32 ethylene oxide units, dodecylphenoxy(polyethoxyethyl) derived from ethoxylated dodecylphenol with 1 to 30 ethylene oxide units, and nonylphenoxy(polyalkoxyalkyl) derived from nonylphenol alkoxylated with both propylene oxide (1 to 6 units) and ethylene oxide (1 to 22 units), so that the upper limit of the range is about 80 carbon atoms and 30 ether oxygen atoms.

Aliphatic R groups include alkyl and alkenyl groups having up to 30 carbon atoms, e.g. methyl, ethyl, propyl, isopropyl, butyl, isobutyl, t-butyl, s-butyl, amyl, neopentyl, isoamyl, hexyl, decyl, isodecyl, lauryl, tridecyl, $C_{12-15}$ mixed alkyl, stearyl, eicosyl, docosyl, triacontanyl, allyl, methallyl and oleyl. Alkyl and alkenyl R groups having 8 to 18 carbon atoms are preferred.

Ether-interrupted alkyl groups have 3 or more carbon atoms and 1 or more ether oxygen atoms disposed in such a way that ether oxygen atoms are separated from one another by two or more carbon atoms; accordingly the number of carbon atoms is at least one more than twice the number of ether oxygen atoms. Ether-interrupted alkyl groups include for example 2-methoxyethyl, 2-ethoxyethyl, 1-methoxy-2-propyl, 2-isopropoxyethyl, 2-butoxyethyl, 2-isobutoxyethyl, 2-hexyloxyethyl, 2-cyclohexyloxy-ethyl, 2-phenoxyethyl, 2(2°-methoxyethoxy)ethyl, 2(2'-ethoxy-ethoxy)ethyl, 2(2'-isopropoxyethoxy)ethyl, 2(2'-butoxyethoxy)ethyl, 2(2'-isobutoxyethoxy)ethyl, and residue of triethylene glycol monoethylether, monobutylether, or residue of glycerin-1,2-dimethyl ether, -1,3-dimethylether, -1,3-diethylether, -1-ethyl-2-propylether, and lauroxypolyethoxyethyl derived from ethoxylated lauryl alcohol with 3 to 18 units of ethylene oxide, butoxypolypropoxy-2-propyl derived from polypropoxylated butanol with 4 to 15 units of propylene oxide, and methoxy(polyalkoxyalkyl) derived from methanol alkoxylated with both propylene oxide (1 to 6 units) and ethyleneoxide (1 to 10 units), so that the upper limit of the range is about 50 carbon atoms and 24 ether oxygen atoms.

Cycloaliphatic groups include cycloalkyl groups having 5 to 20 carbon atoms, e.g. cyclopentyl, cyclohexyl, methyl-cyclopentyl, dimethylcyclobutyl, 4-methylcyclohexyl, 4-t-butylcyclohexyl, cyclooctyl, cyclododecyl, 1,2,3,4-tetrahydro-2-naphthyl, decahydro-1-naphthyl, hydrodicyclopentadienyl, cholesteryl, and dehydroabietyl.

When the metal organic phosphate is of an alkali metal, such as potassium, and R' is an R group, such as decyl, the phosphate is an ester-salt having one metal atom per phosphate group. Such as compound, for which m=1, can be represented by the formula

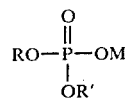

and exemplified by potassium didecyl phosphate in which R and R' are decyl and M is potassium. When R' is also an alkali metal, the phosphate is a salt having two metal atoms per phosphate group, exemplified by dipotassium decylphosphate in which R is decyl and both R and M are potassium.

When the metal organic phosphate is a salt of a two-valent metal, such as magnesium, and R' is an R group, such as decyl, the phosphate is an ester salt having usually two phosphate groups per metal atom. Such a compound, for which m=2, can be represented by the formula

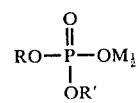

or more fully

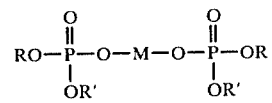

and exemplified by magnesium di(didecyl phosphate). Two-valent metals having a strong tendency to form basic salts, such as dialkyltin, also furnish ester salts having two phosphate groups for two or more metal atoms.

To include such basic salts, the preceding formula can be written as

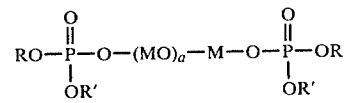

in which a is zero or an integer from 1 to 2 and M is dialkyltin.

When the metal organic phosphate is of a two-valent metal and R' is a metal equivalent, the phosphate is a salt having a 1:1 ratio of phosphate groups to metal atoms. Such a compound, for which m=2, can be represented by the formula

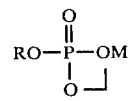

as an algebraic equivalent of

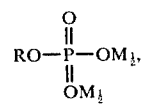

as well as by an 8-membered "cyclic dimer" or a 12-membered "cyclic timer" or a "linear polymer" formula, and exemplified by magnesium monodecyl phosphate (1:1), in which R is decyl and M is magnesium. The beta diketone compound component (B) of the stabilizer composition of this invention is one of a class of known beta diketone compounds represents by the formula

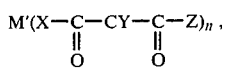

in which n is the valence of M' one or two; X is a hydrocarbon group, an alkoxyhydrocarbon group or an alkylenedioxyhydrocarbon group having up to 18 carbon atoms; Y is a hydrogen atom, an acyl group

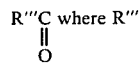

is alkyl or aryl, or an X group; Z is a hydrogen atom, a halohydrocarbon group, or an X group; and M' is hydrogen or a metal M as defined above. The group X can also be linked with the group y or the group Z in a 5 to 6 membered carbocyclic or oxygen-heterocyclic ring structure.

When in this formula M' is a hydrogen atom, the formula becomes

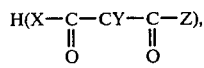

which is a way to indicate by a single expression that the hydrogen atom can be linked in more than one way, as in the tautomeric formulas I to III (i.e. formulas of compounds in readily movable equilibrium with one another)

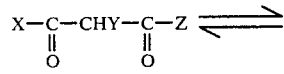

(I)

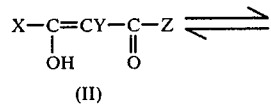

(II)

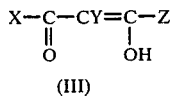

(III)

the latter two of which are identical when X and Z are the same and non-identical when X and Z are different. The relative proportions of tautomers I, II, and III in the beta-diketone compounds is a function of the identity or R and R''; for example the enol content (i.e. combined content of the C=C containing tautomers II and III) has been reported as 76.4% for diacetylmethane (R=R''=methyl) and 89.2% for acetyl-benzoylmethane (R=methyl, R''=phenyl) (see A. Gero, J. Organic Chem. 1954, vol. 19, p. 1960-1970). When M is a metal, the formula

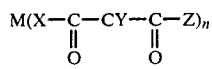

indicates that, while numerous structural formulas can be written differing in the location of various linkages (as illustrated for zinc acetylbenzoylmethane by formulas IV to VII below), all are equivalent representations of a single compound which is better represented as a "hybrid" of all formulas than by any single one. In formulas IV to VII, Ph represents phenyl and Me represents methyl.

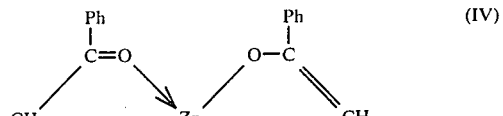

(IV)

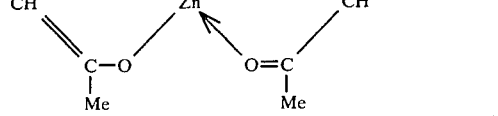

(V)

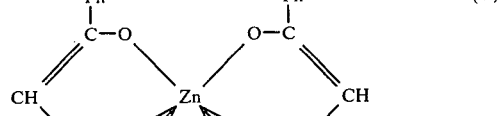

(VI)

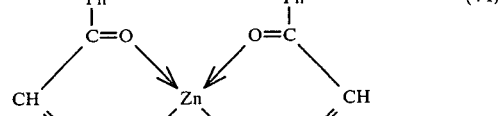

(VII)

In the formula of beta diketone metal compounds, n is the valence of the metal and the number of beta-diketone groups per metal atom, as shown:

| M | Li | Na | K | Mg | Ca | Sr | Ba | Zn |
|---|----|----|---|----|----|----|----|----|
| n | 1  | 1  | 1 | 2  | 2  | 2  | 2  | 2  |

Hydrocarbon groups X, Y, Z, and R''' can be open chain or cyclic and include such aliphatic, cycloaliphatic, and aromatic hydrocarbon groups as alkyl and alkenyl groups having 1 to 18 carbon atoms, cycloalkyl, cycloalkenyl and cycloalkylalkylene, and alkylcycloalkyl groups having 5 to 18 carbon atoms, and non-condensed aryl groups (including aralkyl and alkyaryl) having 6 to 18 carbon atoms, for example methyl, ethyl, propyl, isopropyl, isobutyl, n-butyl, s-butyl, t-butyl, 1-pentyl, 3-pentyl, 1-hexyl, 1-heptyl, 3-heptyl, 1-octyl, 2,4,4-trimethylpentyl, t-octyl, nonyl, decyl, tridecyl, pentadecyl, heptadec-8-en-1-yl, n-octadecyl, allyl, methallyl, 2-hexenyl, 1-methylcyclopentyl, cyclohexyl, cyclohexanepropyl, phenyl, m-tolyl, p-ethylphenyl, t-butylphenyl, benzyl, phenylpropyl and nonylbenzyl. Halohydrocarbon X, Y, Z, and R''' groups include dichloromethyl, heptafluoropropyl, p-bromophenyl, and 3,4-dichlorobenzyl. Alkoxyhydrocarbon X, Y, Z, and R''' groups include ethoxymethyl, n-butoxymethyl, 2-methoxyethyl, 2-methoxyphenyl, and 4-n-octoxyphenylbenzyl. X, Y, Z, and R''' alkylenedioxyhydrocarbon groups include 3(ethylenedioxypropyl) and 3,4-methylenedioxyphenyl.

When the groups X and Y are linked to form an oxygen-heterocyclic ring, the betadiketone compound can be for example dehydroacetic acid, dehydropropionylacetic acid, and dehydrobenzoylacetic acid. When the groups X and Y are linked to form a carbocyclic ring, the betadiketone compound can be for example 2-acetyl-1-tetralone, 1-palmitoyl-2-tetralone, 2-stearoyl-1-tetra-lone, 2-benzoyl-1-tetralone, 2-acetyl-cyclohexanone, and 2-benzoylcyclohexanone. When the groups X and Z are linked to form a carbocyclic ring, the betadiketone compound can be for example cyclopentane-1,3-dione, cyclohexane-1,3-dione, 5,5-dimethylcyclohexane-1,3-dione, 2,2'-methylenebis(cyclohexane-1,3-dione), and 2-acetylcyclohexane-1,3-dione. When X, Y, and Z are discrete groups, the betadiketone compound can be, for example, benzoyl-p-chlorobenzoylmethane, bis(4-methyl-benzoyl)methane, bis(2-hydroxybenzoyl)methane, benzoylacetylmethane, tribenzoylmethane, diacetylbenzoylmethane, stearoyl-benzoylmethane, palmitoyl-benzoylmethane, lauroyl-benzoylmethane, dibenzoyl-methane, 4-methoxybenzoyl-benzoylmethane, bis(4-methoxybenzoyl)methane, bis(4-chlorobenzoyl)methane, bis(3,4-methylenebenzoyl)methane, benzoyl-acetyl-octylmethane, benzoyl-acetyl-phenylmethane, stearoyl-4-methoxybenzoylmethane, bis(4-t-butylbenzoyl)methane, benzoylacetyl-ethylmethane, benzoyl-trifluoroacetyl-methane, diacetylmethane, butanoyl-acetylmethane, heptanoyl-acetylmethane, triacetylmethane, stearoyl-acetylmethane, palmitoyl-acetylmethane, lauroyl-acetylmethane, benzoyl-formylmethane, acetyl-formyl-methylmethane, benzoyl-phenylacetylmethane, bis(cyclohexane-carbonyl)methane, and dipivaloylmethane. The Li, Na, K, Mg, Ca, Sr, Ba, and Zn salts of the above betadiketone compounds can also be used.

The stabilizer composition of this invention is applicable to any vinyl chloride polymer. The term "vinyl chloride polymer" as used herein is inclusive of any polymer formed at least in part of the recurring group,

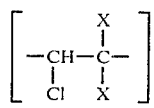

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor porportion, such as copolymers of vinyl chloride and vinyl acetate, copolymers of vinyl chloride with maleic or fumaric acids or esters, and copolymers of vinyl chloride with acrylonitrile, 1-butene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent modulus of elasticity greater than 7000 grams per square centimeter (100,000 psi) at 23° C.

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

The stabilizer combinations of this invention are effective in improving initial color and heat stability of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers, provide greatly improved resistance to heat degradation not obtainable with the other heat stabilizers alone.

The stabilizer composition of this invention shows synergistic interaction and provides improved effectiveness when used together with certain known useful additives, including particularly 1,2-epoxides, hindered phenols, organic phosphites, the esters, amides, and hydrazides of thiodialkylenedicarboxylic acids, 3-aminocrotonic acid, and nitrilotrialkylenetricarboxylic acids, aliphatic polyhydric alcohols having 3 to 8 alcoholic hydroxyl groups and zinc, magnesium, calcium, barium, and strontium salts of non-nitrogenous monocarboxylic acids having 6 to 24 carbon atoms or hydrocarbon substituted phenols having 10 to 30 carbon atoms. Phenol stabilizers can be included with the stabilizer composition of this invention in amounts corresponding to 0.01 to about 0.2 parts per parts of polymer being stabilized. Typical phenol stabilizers are butylated hydroxy-toluene (BHT), 4,4'-isopropylidenebisphenol, and 1,1,3-tris(2'methyl-4'-hydroxy-5=-t-butylphenyl)-butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tripentaerythritol, mannitol, srobitol, and partial esters of these with saturated and unsaturated fatty acids having 6 to 22 carbon atoms.

Organic phosphite stabilizers can be included with the stabilizer composition of this invention in amounts corresponding to 0.05 to about 2 parts by weight per 100 parts by weight of polymer being stabilized. Typical phosphite stabilizers are triphenyl phosphite, diphenyl phosphite, tris(nonylphenyl) phosphite, 2-ethylhexyl diphenyl phosphite, diisodecyl phenyl phosphite, trinonyl phosphite, and pentaerythritol bis(n-octadecyl phosphite). The phosphite stabilizer can have one or a plurality of phosphite ester groups and from 10 to about 75 carbon atoms. A comprehensive disclosure of organic phosphite stabilizers at column 13 line 63 to column 15 line 48 of M. Minagawa U.S. Pat. No. 3,849,370 is here incorporated by reference. Oxirane of 1,2-epoxide stabilizers can be included with the stabilizer composition of this invention in amounts corresponding to 0.2 to about 20 parts by weight per 100 parts by weight of polymer being stabilized. Typical 1,2-epoxide stabilizers are epoxidized polybutadiene, epoxysoybean oil, epoxylinseed oil, and 2-ethylhexyl epoxystearate. The epoxide stabilizer can have one or a plurality of oxirane or 1,2-epoxide groups and from 15 to 150 carbon atoms. A comprehensive disclosure of epoxide stabilizers at column 26 lines 12 to 40 and column 27 lines 17 to 51 of M. Minagawa U.S. Pat. No. 3,869,423 is here incorporated by reference.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2′-thiobis(acetyl ethanolamine), 3,3′-thiobis(propionyldiisopropanolamine, nitrilotriacetic acid (NTA) propylene glycol ester, NTA tris (ethylamide), NTA bis(hydroxyethyl) N-butylamide, 3,3′-thiodipropionyldihydrazide and 6,6′-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2′-thiodiethyl 3-aminocrotonate; thiocarbanilide and 2-phenylindole, 1,3-dibutylthiourea, phenylurea, and p-ethoxyphenylurea.

In a zinc, magnesium, calcium, barium, and strontium carboxylic acid or hydrocarbon substituted phenol salt used together with a stabilizer composition of this invention, the acid can be any mono-carboxylic acid free of nitrogen and having from 6 to 24 carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, and hydroxyl. By the term "alicyclic" it will be understood that there is intended any cyclic acid in which the ring is non-aromatic and composed solely of carbon atoms, and such acidsmay if desired have inert, nonreactive substituents such as halogen, hydroxyl, alkyl radicals, alkenyl radicals and other carbocyclic rang structures condensed therewith. The oxygen containing heterocyclic compounds can be aromatic or non aromatic and can include oxygen and carbon in the ring structure, such as alkyl substituted furoic acid. The aromatic acids likewise can have non-reactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, sorbic acid, n-octoic acid, isooctoic acid, 3,5,5-trimethyl hexoic acid, pelargonic acid, capric acid, neodecanoic acid, undecylenic acid, lauric acid, myristic acid, isodecanoic acid, palmitic acid, isostearic acid, stearic acid, oleic acid, ricinoleic acid, erucic acid, behenic acid, chlorocaproic acid, 12-hydroxy stearic acid, 12-ketostearic acid, phenyl stearic acid, benzoic acid, phenylacetic acid, p-t-butylbenzoic acid, ethylbenzoic acid, isopropylbenzoic acid, bromobenzoic acid, salicylic acid, naphthoic acid, 1-naphthaleneacetic acid, orthobenzoyl benzoic acid, 5-t-octylsalicylic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

In combination with the above metal salts of organic acids, or in lieu thereof, a metal salt of an optionally hydrocarbon-substituted phenol can be used. The hydrocarbon substituents contain from one to twenty-four carbon atoms each. The metal can be an alkali metal or alkaline earth metal such as sodium, potassium, lithium, calcium, strontium, magnesium, and barium. Among such polyvalent metal phenolates there can be mentioned the magnesium, barium, calcium, strontium, tin and zinc salts of phenol, ethylphenol, cresol, xylenol, butyl phenol, isoamyl phenol, isooctyl phenol, 2-ethylhexyl phenol, t-nonylphenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The metal phenolate should be compatible with the halogen-containing resin.

Mixtures of salts of various metals can be used, and many such mixtures are known to give enhanced effects, such as mixed zinc and tin salts with the alkaline earth metal salts, e.g., barium and zinc stearates, as in U.S. Pat. No. 2,446,976. Stabilizer compositions in accordance with this invention can be in solid, liquid or paste form. Liquid compositions can be prepared by blending the ingredients and heating at 40° to 200° C. for up to 6 hours to achieve visual homogeneity and storage stability. Inert ingredients that can be added to the stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate.

Following are the methods used in testing vinyl chloride polymer compositions containing stabilizer compositions according to this invention or control compositions used for comparison purposes.

Oven heat stability: Samples of each indicated formulation proportioned to 200 grams of vinyl chloride polymer are compounded on a two-roll mill until well mixed and removed in the form of sheets 1 mm in thickness. Strips cut from each sheet are exposed in an air circulating oven at the indicated temperature, and one strip of each formulation removed every five minutes and attached to a record card. Heat stability was recorded as the time in minutes to the first failure point represented by a deep orange, red, brown or black color.

Clarity and initial Color: These properties are rated visually by comparing samples of each indicated formulation to a standard, to which is assigned the rating "medium". Unless otherwise indicated, the standard used is a sample of Control 2-1, e.g. the base formulation of Example 2 below with 1.1 part barium nonvlphenate and 0.05 part dibenzoylmethane added. Clarity is rated by viewing samples against a black background and initial color by viewing samples against a white background.

Weatherability: Samples are exposed in a carbon arc accelerated weathering unit (Atlas Electric Devices Co. "Weatherometer") operated without water spray at 52° C. black panel temperature and 41°–44° C. air temperature. Samples are examined once daily for failure signs including spotting, uniform darkening, stiffening, and-/or embrittlement, any one of which marks the failure of the sample. Weatherability is expressed in hours to such failure.

EXAMPLE 1

A sheet of 1 mm in thickness was prepared by mixing on a two roll mill the formulation, and submitted to the performance tests shown.

The stabilizer compositions used and the test results are shown in Table 1.

| (FORMULATION) | | |
|---|---|---|
| PVC (Geon 103EP) | 100 | parts by weight |
| DOP | 50 | |
| Epoxidized soybean oil | 3.0 | |
| Stearic Acid | 0.2 | |
| Phosphorus-containing Metal compound (Table-1) | 1.0 | |
| Beta-Diketone compound (Table-1) | 0.1 | |

TABLE-1

| | STABILIZERS | HEAT STABILITY (175° C.) Min. | INITIAL COLOR | WEATHERABILITY Hrs. |
|---|---|---|---|---|
| CONTROL | | | | |
| 1-1 | Ba . Distearylphosphate Ethylacetoacetate | 60 | Inferior | 280 |
| EXAMPLE | | | | |
| 1-1 | Ba . Distearylphosphate Dehydroacetic acid | 75 | Very good | 350 |
| 1-2 | Ba . Distearylphosphate Zn-Dehydroacetate | 80 | Very good | 380 |
| 1-3 | Ba . Distearylphosphate Dibenzoylmethane | 85 | Very good | 410 |
| 1-4 | Ba-distearylphosphate Benzoylacetone | 75 | Very good | 360 |
| 1-5 | Ba-distearylphosphate Dibenzoylmethane-Zn | 85 | Very good | 430 |
| 1-6 | Ca-distearylphosphate Stearoylacetone | 75 | Good | 370 |
| 1-7 | Mg-distearylphosphate tribenzoylmethane | 75 | Good | 360 |
| 1-8 | Sr-distearylphosphate 2-Acetylcyclohexanone | 80 | Good | 450 |
| 1-9 | Na-distearylphosphate Dibenzoylmethane | 75 | Very good | 380 |
| 1-10 | Dibutyltin-distearyl-phosphate Dehydroacetic acid | 85 | Very good | 430 |
| 1-11 | Mg-dioctylphosphate Dibenzoylmethane | 75 | Good | 410 |
| 1-12 | Ca-dibenzoylphosphate Dibenzoylmethane | 75 | Good | 390 |

The results of these tests demonstrate the surprising improvement in each of three properties provided by stabilizer compositions according to this invention as compared to a different composition.

EXAMPLE 2

Milled sheets of PVC with various barium-zinc combinations were submitted to performance tests carried out in the same way as in Example 1.

| (FORMULATION) | | |
|---|---|---|
| PVC (Geon 103EP) | 100 | parts by weight |
| DOP | 50 | |
| Stearic acid | 0.3 | |
| Isooctyldiphenylphosphite | 0.3 | |
| Zn-octanoate | 0.3 | |
| Ba salt (Table-2) | | as shown in Table 2 (note) |
| Beta-Diketone compounds (Table-2) | 0.05 | |

(NOTE)
Barium salt quantity is adjusted to same Ba level as 1.1 parts by weight of Ba nonylphenolate.

TABLE-2

| | STABILIZERS | AMOUNT | HEAT STABILITY (175° C.) Min. | INITIAL COLOR | HEAT COLOR CHANGE* Min. |
|---|---|---|---|---|---|
| CONTROL | | | | | |
| 2-1 | Ba-nonylphenolate | 1.1 | | | |
| | Dibenzoylmethane | 0.05 | 80 | Medium | 30 |
| 2-2 | Ba-dilaurylphosphate | 1.9 | | | |
| | Ca-ethylacetoacetate | 0.05 | 60 | Inferior | 35 |
| EXAMPLE | | | | | |
| 2-1 | Ba-dilaurylphosphate | 1.9 | | | |
| | Ba-dehydroacetate | 0.05 | 105 | Very good | 75 |
| 2-2 | Ba-dioctylphosphate | 1.5 | | | |
| | Na-dehydroacetate | 0.05 | 110 | Very good | 65 |
| 2-3 | Ba-bis($C_{12-15}$ alkyl) phosphate | 2.1 | | | |
| | Dibenzoylmethane . Ca | 0.05 | 105 | Very good | 65 |
| 2-4 | Ba-diphenylphosphate | 1.2 | | | |
| | Dibenzoylmethane . Mg | 0.05 | 95 | Good | 75 |
| 2-5 | Ba-dicresylphosphate | 1.3 | | | |
| | Dibenzoylmethane . Ba | 0.05 | 95 | Good | 75 |
| 2-6 | Ba-dixylenylphosphate | 1.4 | | | |
| | Dibenzoylmethane . Na | 0.05 | 95 | Good | 65 |
| 2-7 | Ba-dibutoxyethylphosphate | 1.4 | | | |
| | Benzoylacetone . Zn | 0.05 | 105 | Very good | 80 |
| 2-8 | Ba-dinonylphenylphosphate | 2.2 | 95 | Good | 75 |
| | Benzoylacetone . Sr | | | | |
| 2-9 | Ba-monostearylphosphate | 0.7 | | | |
| | Ba-distearylphosphate | 0.7 | | | |
| | Dibenzoylmethane | 0.05 | 100 | Very good | 85 |
| 2-10 | Ba-monostearylphosphate | 0.9 | | | |
| | Dehydroacetic acid | 0.05 | 95 | Very good | 65 |
| 2-11 | Ba-distearylphosphate | 2.6 | | | |
| | Bis(2-hydroxybenzoyl)methane | 0.05 | 100 | Very good | 80 |

*Time of first color development at 175° C. in heating aging test.

The results of these tests demonstrate the surprising improvement obtained in color protection and heat stability with compositions of this invention compared to compositions in which either essential component is replaced by a metal compound or organic additive not of this invention.

EXAMPLE 3

Milled sheets of PVC with various calcum-zinc combinations were submitted to performance tests carried out in the same way as in Example 1.

| (FORMULATION) | | |
|---|---|---|
| PVC (Geon 103EP-8) | 100 | parts by weight |
| ABS (Blendex 111) | 10 | |
| Epoxidized soybean oil | 3 | |
| Tetra($C_{12-15}$ alkyl) bisphenol A diphosphite | 0.5 | |
| Zn salt (Table-3) | | as shown in Table 3 (Note) |
| Beta-Diketone compound (Table-3) | 0.2 | |

(NOTE)
Zinc salt quantity is adjusted to same Zn level as 0.5 part by weight of Zn stearate.

TABLE-3

| | STABILIZERS | AMOUNT | HEAT STABILITY (190° C.) Min. | INITIAL COLOR |
|---|---|---|---|---|
| CONTROL | | | | |
| 3-1 | Zn stearate | 0.5 | | |
| | Benzoylacetyloctylmethane | 0.2 | 75 | Medium |
| 3-2 | Zn-bis(monooctylphosphite) | 0.37 | | |
| | Diacetylmethane | 0.2 | 60 | Inferior |
| EXAMPLE | | | | |
| 3-1 | Zn distearylphosphate | 1.05 | | |
| | Benzoylacetyloctylmethane | 0.2 | 90 | Very good |
| 3-2 | Zn dibenzylphosphate | 0.51 | | |
| | Diacetylmethane | 0.2 | 100 | Good |
| 3-3 | Zn dicyclohexylphosphate | 0.48 | | |
| | Triacetylmethane | 0.2 | 105 | Good |
| 3-4 | Zn monolaurylphosphate | 0.27 | | |
| | Dehydropropionylacetic acid | 0.2 | 100 | Very good |
| 3-5 | Zn monooctylphosphate | 0.23 | | |
| | Dehydrobenzoylacetic acid | 0.2 | 115 | Very good |
| 3-6 | Zn dinonylphenoxypolyethoxyphosphate | 2.2 | 90 | Good |

TABLE-3-continued

| | STABILIZERS | AMOUNT | HEAT STABILITY (190° C.) Min. | INITIAL COLOR |
|---|---|---|---|---|
| 3-7 | K . dehydroacetate | 0.2 | | |
| | Zn diisodecylphosphate | 0.18 | | |
| | Zn monodecylphosphate | 0.18 | | |
| | Dibenzoylmethane | 0.2 | 105 | Very Good |

The results of these tests demonstrate the surprising advantage in initial color and heat stability obtained in Examples 3-1 to 3-7 of this invention compared to the Control compositions.

EXAMPLE 4

Heat stability, initial color and clarity tests were carried out with a composition of this invention containing various organic phosphites.

The organic phosphites used and the test results are shown in the following Table 4.

| (FORMULATION) | | |
|---|---|---|
| PVC (Geon 103EP) | 100 | parts by weight |
| DOP | 48 | |
| Stearic acid | 0.3 | |
| Zn neodecanoate | 0.3 | |
| Mg toluate | 0.5 | |
| Ca dilaurylphosphate | 0.5 | |
| Organic phosphite (Table-4) | | variable weight as shown |
| Epoxidized linseed oil | 2 | |
| Dibenzoylmethane | 0.1 | |

TABLE-4

| EXAMPLE | ORGANIC PHOSPHITES | AMOUNT | HEAT STABILITY (180° C.) Min. | INITIAL COLOR | CLARITY |
|---|---|---|---|---|---|
| 4-1 | None | — | 95 | Good | Good |
| 4-2 | Monoisodecylacid phosphite | 0.1 | 110 | Very Good | Very Good |
| 4-3 | Diisodecylacid phosphite | 0.1 | 115 | Very Good | Very Good |
| 4-4 | Diphenylacidphosphite | 0.2 | 120 | Very Good | Very Good |
| 4-5 | Mono-2-ethylhexyldiphenylphosphite | 0.5 | 120 | Very Good | Very Good |
| 4-6 | Ditridecyl . phenylphosphite | 0.5 | 120 | Very Good | Very Good |
| 4-7 | Diisodecyl . phenylphosphite | 0.3 | 120 | Very Good | Very Good |
| 4-8 | Tris(nonylphenyl)phosphite | 0.3 | 120 | Very Good | Very Good |
| 4-9 | Tris(2,4-di-t-butylphenyl)phosphite | 0.3 | 120 | Very Good | Very Good |
| 4-10 | Triphenylphosphite | 0.5 | 110 | Very Good | Very Good |
| 4-11 | Tridecyl . Diphenylphosphite | 0.3 | 120 | Very Good | Very Good |

The results demonstrate the advantageous use of organic phosphites together with compositions in accordance with this invention.

EXAMPLE 5

Heat stability tests were carried out with a composition of this invention to which various epoxy compounds were added.

The epoxy compounds used and the test results are shown in Table 5.

| (FORMULATION) | | |
|---|---|---|
| PVC (Geon 103EP) | 100 | parts by weight |
| DOP | 50 | |
| Stearic acid | 0.3 | |
| Zn toluate | 0.3 | |
| Dehydroacetic acid | 0.1 | |
| Ba monolaurylphosphate | 0.4 | |

-continued

| (FORMULATION) | |
|---|---|
| Ba dilaurylphosphate | 0.4 |
| Diisodecylmonophenylphosphite | 0.5 |
| Epoxy compounds (Table-5) | 0.5 |

TABLE-5

| No. | EPOXY COMPOUNDS | HEAT STABILITY (190° C.) Min. |
|---|---|---|
| 5-1 | None | 80 |
| 5-2 | Epoxidized polybutadiene | 115 |
| 5-3 | Butyl epoxystearate | 110 |
| 5-4 | Vinylcyclohexanedioxide | 100 |
| 5-5 | 3,4-Epoxycyclohexyl-6-methyl-epoxycyclohexanecarboxylate | 115 |
| 5-6 | Bisphenol A . diglycidyl ether | 120 |
| 5-7 | Dicyclopentadienedioxide | 100 |

These results demonstrate the advantageous use of 1,2-epoxides together with compositions in accordance with this invention.

EXAMPLE 6

Oven heat stability and initial color tests were carried out with a composition of this invention to which various metal carboxylates or substituted phenolates were added.

The results used and the results obtained are shown in Table 6.

| (FORMULATION) | | |
|---|---|---|
| PVC (Geon 103EP) | 100 | parts by weight |
| DOP | 48 | |
| Epoxidized soybean oil | 2 | |
| Zn dilaurylphosphate | 0.2 | |
| Dibenzoylmethane | 0.1 | |
| Metal salt (Table-6) | | variable weight as shown |

TABLE-6

| NO. | METAL SALTS | HEAT STABILITY (min) | INITIAL COLOR |
|---|---|---|---|
| EXAMPLE | | | |
| 6-1 | None | 60 | Good |
| 6-2 | Ca-stearate (0.7) | 105 | Very Good |
| 6-3 | Ca-stearate (0.6) Zn-stearate (0.1) | 105 | Very Good |
| 6-4 | Ca-benzoate (0.4) Zn-stearate (0.1) | 120 | Very Good |
| 6-5 | Ca-stearate (0.4) Mg-stearat (0.2) Zn-stearate (0.1) | 90 | Very Good |
| 6-6 | Ba-nonylphenolate (0.8) | 120 | Very Good |
| 6-7 | Ba-nonylphenolate (0.8) Zn-p-t-butylbenzoate (0.1) | 115 | Very Good |
| 6-8 | Ba-stearate (1.0) Zn-stearate (0.2) | 115 | Very Good |

The results of these tests show the advantages of using metal carboxylate and metal phenolate salts together with a composition of this invention.

We claim:

1. An environmentally acceptable stabilizer composition for enhancing the resistance to deterioration upon heating at 175° C. of a vinyl chloride polymer from which lead, cadmium, mercury, thallium, and arsenic are substantially excluded, comprising (A) at least one dialkyltin, zinc, alkali metal, or alkaline earth metal organic phosphate ester salt having per metal atom from one to a number equal to the valence of the metal of phosphate ester groups and from one to two organic groups per phosphate groups, the organic groups being alkyl, aryl, alkaryl, aralkyl, ether-interrupted alkyl, or ether-interrupted aralkyl groups having from 1 to about 80 carbon atoms; and (B) at least one betadiketone compound having 5 to about 30 carbon atoms which is a cyclic or open-chain betadiketone or a zinc, alkali metal or alkaline earth metal salt thereof, and is represented by the formula

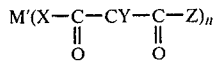

in which n is one or two; X is linked with Y or with Z in a 5 to 6 membered carbocyclic or oxygen-heterocyclic ring structure or when not linked with Y or with Z is a hydrocarbon group, an alkoxyhydrocarbon group, or an alkylenedioxyhydrocarbon group having up to 18 carbon atoms; Y when not linked in a ring structure with X is a hydrogen atom, an acyl group

where R''' is alkyl or aryl, or a hydrocarbon, alkoxyhydrocarbon, or alkylenedioxyhydrocarbon X group; Z is a hydrogen atom, a halohydrocarbon group, or a hydrocarbon, alkoxyhydrocarbon, or alkylenedioxyhydrocarbon X group; and M' is hydrogen, potassium, sodium, lithium, zinc, barium, strontium, calcium, or magnesium.

2. A stabilizer composition according to claim 1 in which the organic phosphate ester salt is an alkyl phosphate ester salt having 8 to 18 carbon atoms in the alkyl group.

3. A stabilizer composition according to claim 1 in which the organic phosphate ester salt is an ether-interrupted alkyl phosphate ester salt having 3 to 50 carbon atoms and 1 to 24 ether oxygen atoms in each ether-interrupted alkyl group, the number of carbon atoms being at least one more than twice the number of etheroxygen atoms.

4. A stabilizer composition according to claim 1 in which the organic phosphate ester salt is an ether-interrupted aralkyl phosphate ester salt having 8 to 80 carbon atoms and 1 to 30 ether oxygen atoms, the number of carbon atoms being at least six more than twice the number of ether oxygen atoms.

5. A stabilizer composition according to claim 1 in which the organic phosphate ester salt is salt having one phosphate ester group and one organic group per metal atom.

6. A stabilizer composition according to claim 1 in which the organic phosphate ester salt has two organic groups per phosphate ester group.

7. A stabilizer composition according to claim 1 in which the organic phosphate ester salt is barium distearyl phosphate.

8. A stabilizer composition according to claim 1 in which the betadiketone compound is an open-chain betadiketone.

9. A stabilizer composition according to claim 1 in which the betadiketone compound is a betadiketone zinc salt.

10. A stabilizer composition according to claim 1 comprising as an added ingredient at least one stabilizer which is an organic phosphite, a 1,2-epoxide, or a zinc, magnesium, calcium, strontium or a barium salt of a non-nitrogenous monocarboxylic acid having 6 to 24 carbon atoms or a hydrocarbon-substituted phenol having 10 to 30 carbon atoms.

11. A stabilizer composition according to claim 1 in which the betadiketone compound is an oxygen-heterocyclic betadiketone compound.

12. A stabilizer composition according to claim 8 in which the betadiketone compound is dibenzoylmethane.

13. A stabilizer composition according to claim 11 in which the betakiketone compound is dehydrobenzoylacetic acid.

14. An environmentally acceptable stablized vinyl chloride polymer composition comprising a vinyl chloride polymer and a stabilizer composition according to claim 1.

* * * * *